United States Patent
Mihelich et al.

[19]

[11] Patent Number: 6,049,952
[45] Date of Patent: Apr. 18, 2000

[54] ENERGY ABSORBING TRIM COMPONENT FASTENING SYSTEM

[75] Inventors: Thomas D. Mihelich, Troy; Sudhakar Kodali, Auburn Hills; Werner H. Schneider, Waterford, all of Mich.

[73] Assignee: Chrysler Corporation, Auburn Hills, Mich.

[21] Appl. No.: 09/151,109

[22] Filed: Sep. 10, 1998

[51] Int. Cl.⁷ .................................................. A44B 21/00
[52] U.S. Cl. ............................... 24/292; 24/289; 24/295; 24/453; 296/189; 52/582.1; 52/713
[58] Field of Search .................................... 24/292, 573.2, 24/293, 294, 295, 532, 289, 453, 563, 341; 296/189, 146.7; 52/713, 714, 528.1, 528.2, 715, 361, 489.2; 403/407.1; 411/913, 508, 510

[56] References Cited

U.S. PATENT DOCUMENTS

| | | |
|---|---|---|
| 3,208,119 | 9/1965 | Seckerson ............................ 24/295 X |
| 3,779,595 | 12/1973 | Suzuki et al. . |
| 3,936,090 | 2/1976 | Aya et al. . |
| 4,229,036 | 10/1980 | Toda . |
| 4,377,060 | 3/1983 | Ragland ................................ 52/714 X |
| 4,402,118 | 9/1983 | Benedetti ................................ 24/289 |
| 4,591,204 | 5/1986 | Gallitzendoerfer et al. . |
| 4,683,622 | 8/1987 | Oehlke .................................. 24/295 X |
| 4,786,100 | 11/1988 | Kleeman et al. . |
| 5,163,730 | 11/1992 | Welch . |
| 5,517,731 | 5/1996 | Spykerman ............................... 24/295 |
| 5,542,158 | 8/1996 | Gronau et al. ........................... 24/295 |
| 5,544,933 | 8/1996 | Shahab et aL. . |
| 5,641,195 | 6/1997 | Patel et al. . |
| 5,833,480 | 11/1998 | Austin .................................. 24/453 X |
| 5,887,319 | 3/1999 | Smith ...................................... 24/293 |
| 5,987,714 | 11/1999 | Smith ...................................... 24/295 |

*Primary Examiner*—James R. Brittain
*Assistant Examiner*—Robert J. Sandy
*Attorney, Agent, or Firm*—Kenneth H. Maclean

[57] ABSTRACT

An energy absorbing interior trim component of plastics is attached to a supporting structural member of a vehicle by one or more special fastening devices. The trim component has a shell-like main housing defining an interior cavity that contains a plurality of laterally spaced energy absorbing ribs, which are designed to deform and collapse upon predetermined impact loads applied to the trim component. The ribs are strategically located and sized for optimized energy absorbing purposes and in accordance with the interior dimensions and shape of the trim component. Each fastening device comprises a steel spring clip having laterally spaced clamping jaw arms for easy installation and substantially permanent attachment to the ribs and having an attachment head which readily fastens into structure defining a narrow elongated slot in the supporting structural member. The trim component is inhibited from inadvertent disconnection from the structural member but can be removed for replacement or repair with simple tools. The energy of an impact load applied to the interior trim component is transferred to the energy absorbing ribs which collapse, tear or otherwise deform to dissipate the transferred impact energy. The fastening device is also designed to fold over to an out of the way position within the interior cavity of the trim component when the component is impacted. The trim component and fastener are an economical and readily manufacturable.

4 Claims, 4 Drawing Sheets

6,049,952

ENERGY ABSORBING TRIM COMPONENT FASTENING SYSTEM

BACKGROUND OF THE INVENTION

1. Field of Invention

The present invention generally relates to automotive vehicle trim components and more particularly an energy absorbing trim component fastening system. This fastening system features new and improved fastening units or clip constructions that augment attachment of the trim component to the support structure and operation of the component when impacted.

2. Description of Related Art

Interior trim components have been used on vehicles for finely finishing the interior of the passenger compartment thereof and for dissipating energy when impacted.

Patel U.S. Pat. No. 5,641,195, and Welch U.S. Pat. No. 5,163,195, are both examples of related prior art. Patel et al discloses an invention in which a trim component is mounted to a structural member through the use of energy absorbing, cantilevered fingers and fastening clips. The Welch disclosure describes a system in which an interior trim component is mounted on a structural pillar, but is separated therefrom by a one piece energy absorbing bracket. While these patents disclose various constructions for fastening trim components to interior support structures of automobiles, they do not provide a fastening system which meets new and higher standards for quickly and securely attaching energy absorbing finishing trim to interior support structures and for enhancing operation of the energy absorbing construction of the trim component after installation as in the present invention.

SUMMARY OF THE INVENTION

The present invention is directed towards the new and improved mounting of automotive vehicle interior trim components, including those having energy absorbing construction, to a structural member by a new and improved fastening device or clip construction substantially permanently secured to the component that augments attachment to the structural member and improves operation of the component.

The present invention in one aspect comprises three primary components, the interior trim member, the fastening device, and the supporting structural member. The interior trim member is an elongated, shell like unit, preferably of a yieldable plastic material, which is attached to the structural member of a vehicle by means of at least one specialized fastening device or clip. The inner surface of the interior trim member comprises a plurality of energy absorbing ribs, which are designed to deform and collapse upon impact in a manner that dissipates impact energy. More particularly, the present invention provides for the transfer of energy from the area of impact to the interior parts of the trim member, where it is dissipated in the collapsing, tearing, twisting or other deformation of the ribs. The ribs are strategically spaced, and terminate in edges adjacent to the support or backing surface provided by the structural member when the trim member is mounted thereon to further improve the energy absorbing ability thereof. The fastening device is a clip which firmly attaches to a rib of the trim member and which can be readily attached to structures particularly those having narrow widths requiring a narrow longitudinally extending slots therein for receiving the fastening device. The overall system is designed such that the fastening device, and its attached interior trim piece, are inhibited from being disconnected from the structural member but can be removed with simple tooling if desired. The fastening device or portions thereof has the designed ability to fold over to an out of the way position within the interior cavity between the interior trim and structural members when the interior trim member is impacted. This fastening device, or clip, is an easily manufacturable component which is preferably stamped from sheet metal. The fastening device securely attaches to the energy-absorbing ribs of the interior trim member and provides a new and improved construction and method for efficiently attaching removable, interior trim pieces to a support structure while improving the impact energy transferring attributes thereof.

PREFERRED EMBODIMENTS

Figure 1:
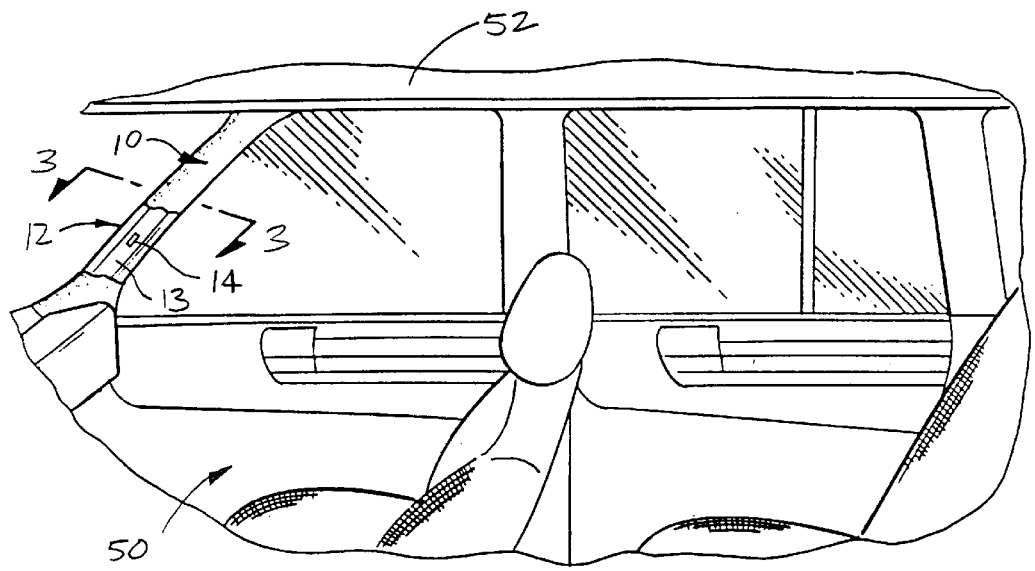
FIG. 1 is a perspective view of a portion of the interior of an automotive vehicle with parts broken away.

Turning now in greater detail to the drawings, FIG. 1 illustrates a one piece interior trim member 10 attached to structural member 12 of automotive vehicle 50. The interior trim member 10 comprises an elongated concave shell, injection molded or otherwise made of suitable plastics material which is adapted to be operatively secured to a structural member such as pillar 12 which secures the roof structure 52 to the main body structure of the vehicle and forms part of the vehicle door framing.

The interior trim member is shaped to generally fit around the contours and dimensions of the supporting structural member. In this way, the interior trim member and structural member compliment each other in size and shape to optimize use of space and provide a finally finished appearance for the interior of the vehicle. The interior trim member comprises a plurality of energy absorbing ribs 18 and attachment tabs 11. The ribs are integral with the shell and are laterally spaced from one another within the concave interior portion thereof. These ribs are generally parallel to one another and extend in a generally normal fashion with respect to the inner surface of the interior trim member. Ribs which are designed to accept fastening devices, have additional supporting ribs 17. These supporting ribs are generally normal to both the inner surface of the interior trim component and the main rib to which the fastener attaches. The supporting ribs assist the assembler when attaching the fastening device to the rib by acting as guides for proper positioning the fastening device in predetermined locations so that they match and operatively align with the narrow elongated slots 14 spaced along the length of the structural number 12. Preferably with some exceptions, as later explained, the ribs terminate in edge portions 19 that are closely adjacent to the inner surface of the structural member of the automobile when the interior trim member is attached thereto. The energy of a load directed onto the interior trim member transfers from the area of impact to the ribs. This impact causes the ribs to rapidly ground on the surface of the mounting wall portion 13 of the structural member 12 and deform the ribs. This deformation of the ribs dissipates the transferred impact energy.

The preferred fastening device is a one-piece stamped sheet metal clip 30 which releasably connects the interior trim member 10 and the structural member 12. As can be best seen in FIGS. 3–5, the clip generally has a flat laterally extending and generally rectangular back portion 22. The back portion 22 is a main support component of the fastening device and generally serves to connect and support the remaining parts thereof.

From the back portion 22, a pair of spring shoulders 34 are reversely curved to extend in front of the back portion. Spring arms 36 extend downwardly from reversely curved shoulders 34 to a terminal edge 39. These arms are in a generally parallel fashion with respect to the back portion 22. The spring arms cooperate with the back portion to define laterally spaced clamping bights 40 therebetween. The tolerance between these parallel spring arms and back portion is predetermined and dictated by the thickness of the energy absorbing rib, so the clip securely clamps thereto. Moreover, each arm and the back portion have inwardly extending and laterally spaced barbs 42, 43 respectively lanced therefrom which extends upwardly at a predetermined angle. The barbs 42, 43 provide one way fasteners or hooking devices which allows the clip 30 to be readily slid over the upper edge portion 19 and clamped onto a rib of the interior trim member. The barbs 42, 43 generally oppose one another are adapted to penetrate into the material of the ribs to prevent the clip from being reversibly slid off by biting into material of the rib. The clamping bight and barbs which firmly secure the clip 30 to the ribs 18 of the interior trim member. With special tools, however, these clips can be removed and replaced or repaired as necessary.

Extending upwardly from a centralized area of the back portion 22 is a flattened neck 21. The neck connects at intentionally weakened points to the back portion and is substantially narrower than the full lateral extent of the back portion. It is at this weaker interface between the back and neck portions that the fastening device is intentionally designed to buckle and fold over to an out of the way location within the confines of the concavity of the shell in response to impact loads directed onto the shell.

Figure 3:
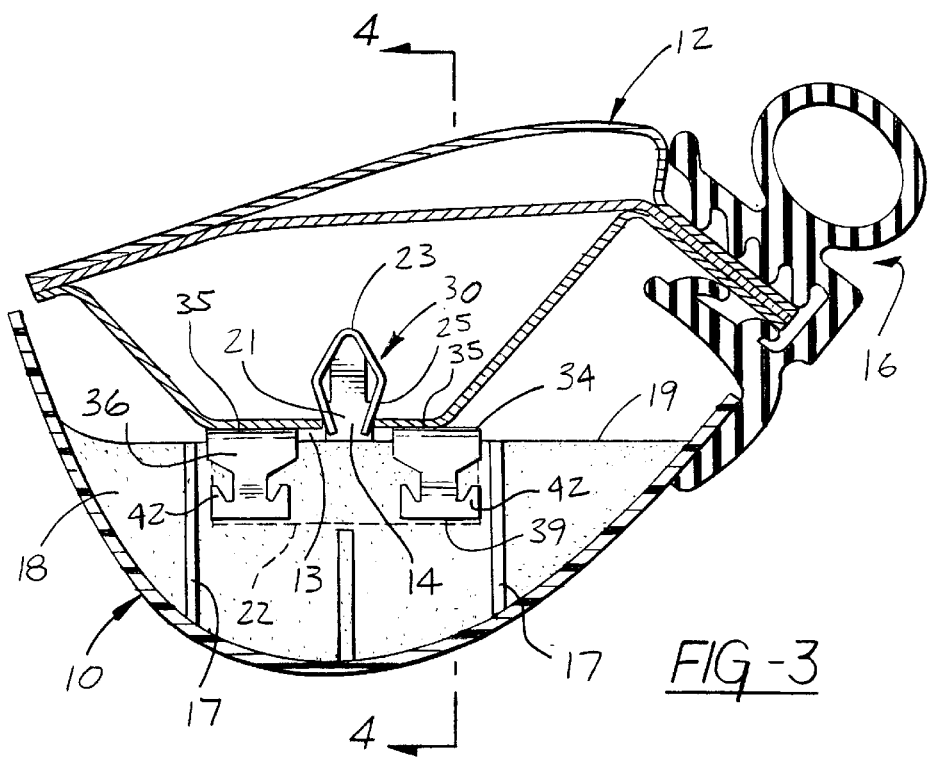
FIG. 3 is a cross-sectional view taken generally along sight lines 3—3 of FIG. 2 and consisting of an interior trim member mounted on a structural member by means of a fastening device.
Figure 2:
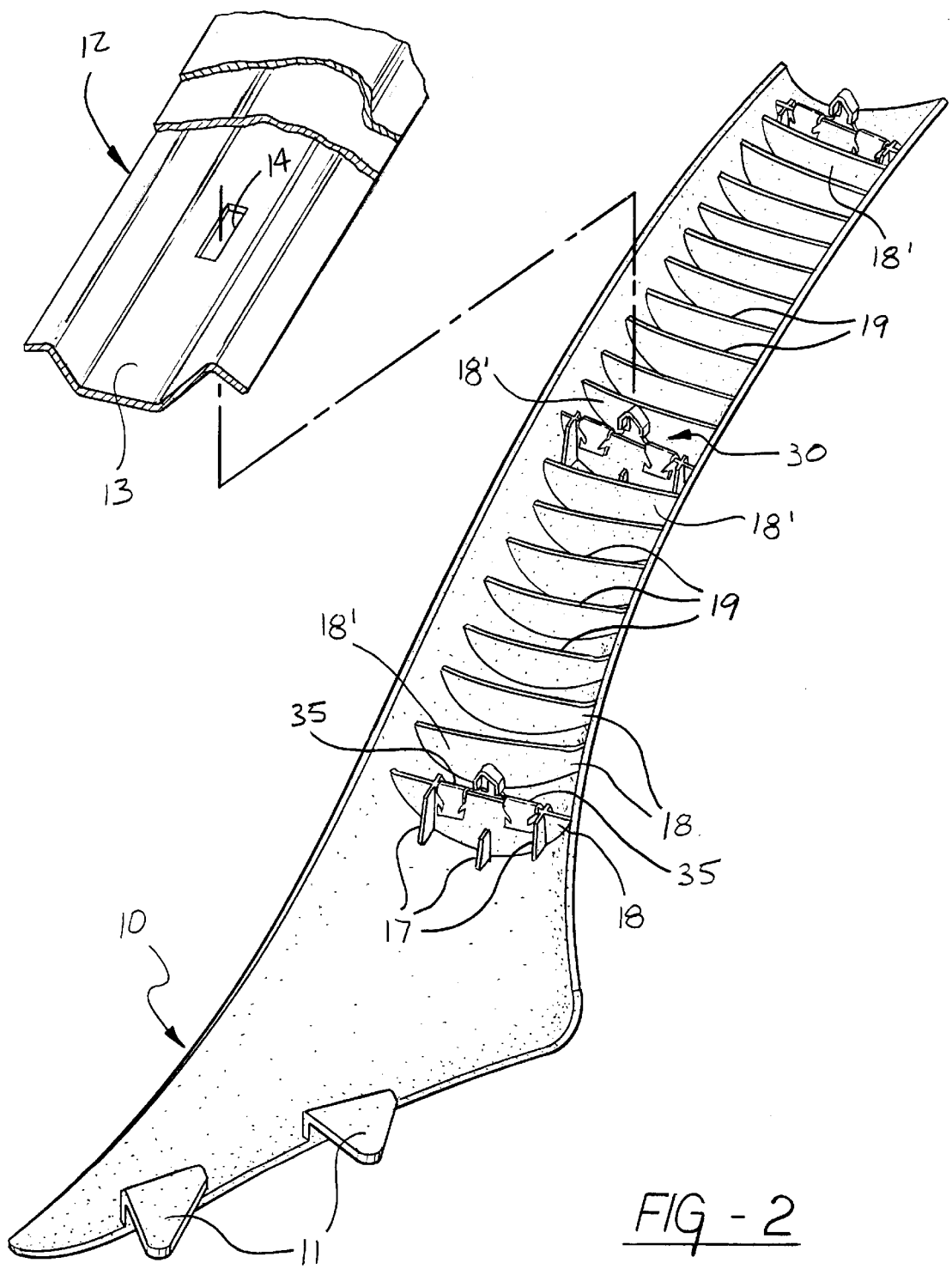
FIG. 2 is a perspective view of an interior trim member of an automotive vehicle with the fastening devices secured thereto prior to its attachment to a structural member.
Figure 4:
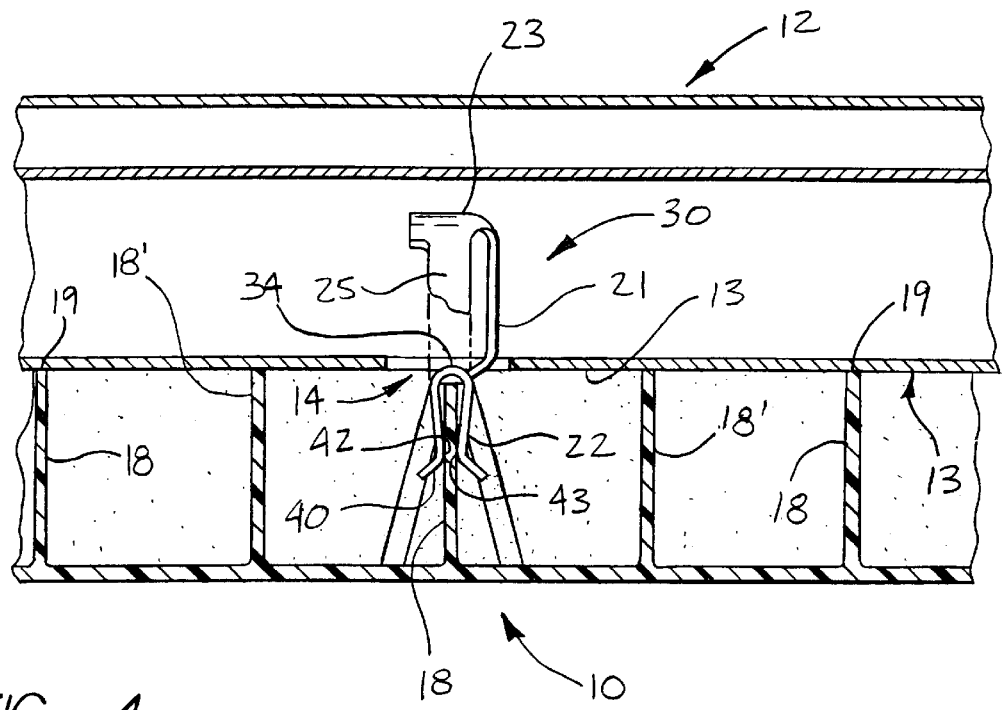
FIG. 4 is a cross-sectional view taken along sight lines 4—4 of FIG. 3 and consisting of an interior trim member mounted on a structural member by means of a fastening device.
Figure 5:
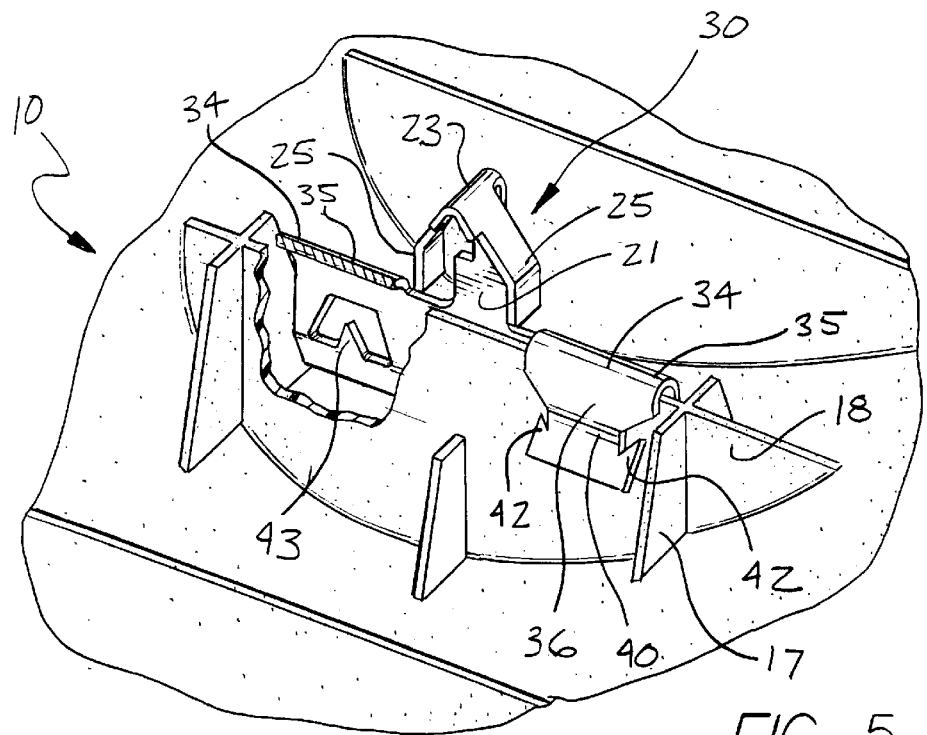
FIG. 5 is an enlarged perspective view of an energy absorbing rib of the trim member of an automotive vehicle with a fastening device secured thereto prior to its attachment to a structural member.
Figure 4A:
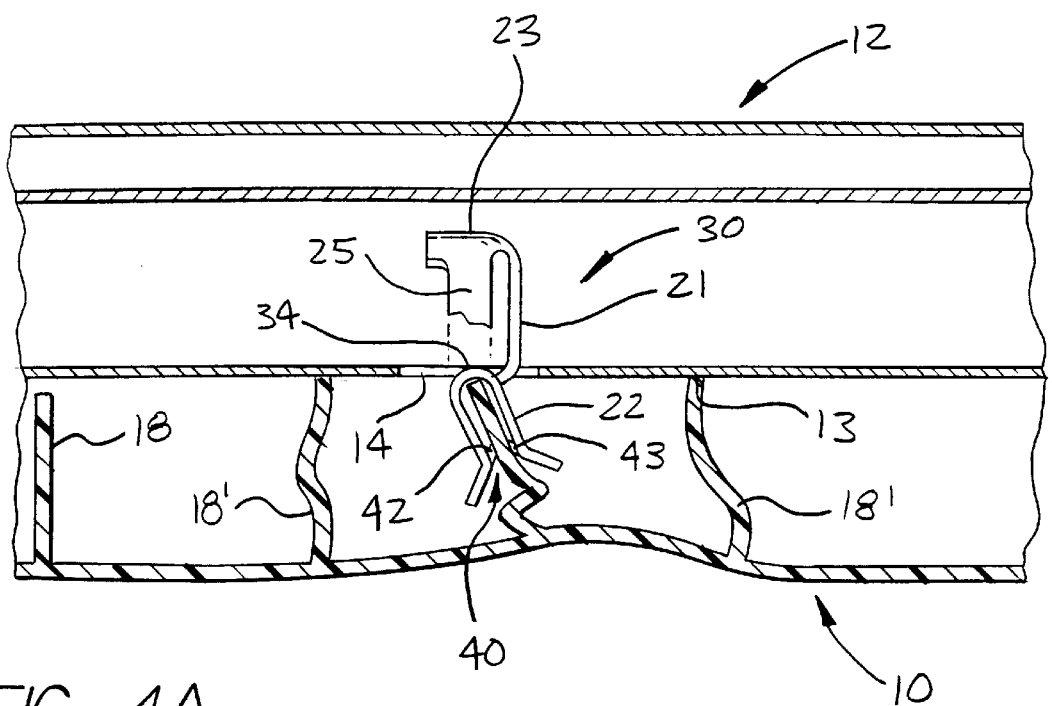
FIG. 4a is a cross sectional view similar to the view of FIG. 4 showing the interior trim member of an automotive vehicle secured to a structural member after being impacted.

The end of the neck connects to a head portion 23, which extends at a predetermined angle from the neck 21. A pair of laterally disposed ears 25 extend downwardly from the head portion 23 at a predetermined angle. The ears are spring-like members and are designed to be pinched inwardly by opposing sides of a longitudinally extending and a generally rectangular slot 14 formed in the narrow mounting wall 13 of the structural member 12 when the trim member is installed. This creates a retention force between the ears, which are trying to spread out while the opposing sides of the slot is restricting them. Therefore, the width dimensions of the narrow slot 14 in relation to width of the ears is important to the good attachment functionality of the present invention. The slot 14 preferably is longitudinally extending in its main dimension for accommodations within the narrow mounting wall 13 of the pillar 12. As best shown in FIG. 4, ribs such as ribs 18 on one or both sides of a clip mounting rib may be slightly higher than the other ribs to limit penetration of the attachment ears into slot 14 so that they will not clear the slot 14 and expand and "fish hook" or otherwise become trapped behind the mounting wall portion and within structure member 10. As shown in FIG. 3, the shoulders 34 of the clip may also contact the surface of the wall portion 13 of the structural member such as at upper contact lines 35 to limit penetration of the attachment ears through slot 14 to prevent permanent "fish hook" locking. The ears of the fastening device are designed to penetrate the slot to a position which would allow the fastening device to be backed out and allow the interior trim member to be removed from of the structural member. Such removal is however, inhibited by the strong, spring-like recovery force of the ears. While these ears are designed to inhibit a motion which would disconnect the interior trim member from the structural member, the interior trim member can be removed with simple tools for replacement or repair.

The structural member provided in this application contains the previously mentioned rectangular slots 14 which are used to pinch and hold the spring-like ears of the fastener, and thereby the interior trim member, into place. As mentioned, this structural member is of a generally complimentary shape and dimension to the interior trim member. The complementary design creates an aesthetically pleasing environment within the passenger cabin and increases interior passenger room by minimizing the wasted space between the trim and structural members. The interface between the surface of the structural member and the energy absorbing has a rather consistent tolerance so there is an even deformation of the ribs near the area of impact. The number of longitudinally spaced slots in the structural member is determined by the optimal number of fasteners needed to securely attach the interior trim member thereto.

As is seen in FIG. 3, conventional elastomer weather stripping 16 is operatively connects to the structural member. A portion of this weather stripping overlaps the interior trim member.

The overall trim component fastening system as described above is designed to serve several purposes. Among those, the system is designed to provide an easily manufactured assembly, to have an interior trim member which is securely fastened to the structural member to maximize interior passenger room without compromising aesthetic requirements, and also to provide improved construction which can transfer energy from an impact area to the energy absorbing ribs while having the fastening device fold over to an out of the way position within the interior cavity of the interior trim member.

The present invention has been described in a descriptive manner for the sake of illustration and not that of limitation. Many variations and modifications of the present invention are possible in light of the spirit and teachings of the present invention. Therefore, it is to be understood that within the boundaries of the appended claims, the present invention could differ from what is specifically described.

What is claimed is:

1. A one piece fastener for securing an energy absorbing panel to an interior support structure in an automotive vehicle, comprising:

a main body formed with a flattened, generally rectilinear and laterally extending back portion and a discrete lower edge portion turned outwardly at a predetermined angle from a laterally extending bight of said back portion to a terminal lower edge, a pair of laterally spaced and rounded hinging shoulders extending upwardly and from an upper portion of said back portion and reversibly curved over in front of said back portion, a pair of laterally spaced spring front arm portions spaced from and extending downwardly in front of said back portion; each of said laterally spaced spring arms being formed with a lower edge portion turned outwardly from a laterally extending bight that interfaces with the bight of said back portion that extends to a terminal edge, a neck portion extending upwardly from said back portion and from a location between said shoulders, a head portion extending at an angle from an upper end of said neck portion and a pair of spring like and laterally extending retention ears depending from opposite sides of said head portion and aligned with said back portion adapted to be pinched inwardly by side walls of a retention slot in the support structure.

2. A one piece fastener for securing an energy absorbing panel to an interior support structure in an automotive vehicle, comprising, a main body formed with a flattened and laterally extending back portion having a discrete lower edge portion turned outwardly at a predetermined angle from a longitudinally extending bight extending across the width of said back portion and terminating at a lower edge, a pair of laterally spaced and rounded spring hinge shoulders extending from an uppermost portion of said back portion and reversibly curved so as to be in front of said back portion, a pair of laterally spaced spring arms spaced and extending from said spring shoulders in front of said back portion, each of said laterally spaced arms being formed with a lower edge portion turned outwardly to form a longitudinally extending bight that interfaces with the bight of said back portion and extending to a terminal edge, said bight of said arms and said back portion cooperating to form spring clamping jaws for receiving a portion of the energy absorbing panel and attaching the energy panel, a neck portion extending upwardly from said back portion and from a location between said arms, a forwardly disposed head portion extending at an angle from an upper end of said neck portion and a pair of laterally extending spring like retention ears aligned with said back portion and depending from opposite sides of said head portion adapted to pinch inwardly by a retention slot in said support structure in said vehicle.

3. The fastener defined in claim 2 and wherein said back portion and said arms have inwardly extending barbs lanced therein and are operative to catch opposite sides of a portion of said energy absorbing panel.

4. The fastener defined in claim 2 wherein said spring retention ears are attached to said head portion and depend therefrom to yieldably deflect and retain said energy absorber in a slot in the structure.

\* \* \* \* \*